US008188422B1

(12) United States Patent
Amerom et al.

(10) Patent No.: US 8,188,422 B1
(45) Date of Patent: May 29, 2012

(54) FABRICATION OF THREE-DIMENSIONAL ION OPTICS ASSEMBLIES BY METALLIZATION OF NON-CONDUCTIVE SUBSTRATES

(75) Inventors: Friso van Amerom, St. Petersburg, FL (US); Ashish Chaudhary, St. Petersburg, FL (US); Shekhar Bhansali, Tampa, FL (US); Robert T. Short, St. Petersburg, FL (US); George Steimle, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 323 days.

(21) Appl. No.: 12/700,355

(22) Filed: Feb. 4, 2010

Related U.S. Application Data

(63) Continuation of application No. 11/368,770, filed on Mar. 6, 2006, now Pat. No. 7,700,911.

(60) Provisional application No. 60/594,018, filed on Mar. 4, 2005.

(51) Int. Cl.
*B01D 59/44* (2006.01)

(52) U.S. Cl. ......... 250/281; 250/291; 250/584; 438/692

(58) Field of Classification Search .................. 438/678; 250/281, 291, 584
See application file for complete search history.

(56) References Cited

U.S. PATENT DOCUMENTS

| | | | | |
|---|---|---|---|---|
| 3,190,536 | A | 6/1965 | Schwartz | |
| 4,853,252 | A | 8/1989 | Frankel et al. | |
| 4,985,116 | A | 1/1991 | Mettler et al. | |
| 5,270,241 | A | 12/1993 | Dennison et al. | |
| 6,762,406 | B2 * | 7/2004 | Cooks et al. | 250/292 |
| 2003/0190536 | A1 | 10/2003 | Fries | |

OTHER PUBLICATIONS

Chaudhary, et al., A Novel Fabrication Technique of Cylindrical Ion Traps Using Low Temperature Co-Fired Ceramic Tapes, Nano Science and Technology Institute, Nanotech, 2004, vol. 1, Chapter 8.
http://en.wikipedia.org/wiki/Photoresist, Photoresist.
http://en.wikipedia.org/wiki/Photolithography, Photolithography.

* cited by examiner

*Primary Examiner* — David Vu
*Assistant Examiner* — Brandon Fox
(74) *Attorney, Agent, or Firm* — Courtney M. Dunn; Smith & Hopen, P.A.

(57) ABSTRACT

A die assembly for creating a ring electrode including a cylindrically-shaped die base, two die walls and a die top sized to fit inside a cylindrical die housing. The die base and die top having a series of concentric elevations used as impressions to form on two ends of the ring electrode. A method of fabricating an LTCC ring electrode using the die assembly is also provided.

5 Claims, 10 Drawing Sheets

| Experimental Parameters for Tests of the LTCC CIT | |
|---|---|
| Total pulse sequence | 120 ms |
| EI time | 50 ms |
| Ramp time | 20 ms |
| Freq. of RF signal | 2.79 MHz |
| Starting voltage | 114 V |
| Final voltage of ramp | 770 V |
| Gain of current amp. | $1 \cdot 10^{6}$ V/A |
| Temperature | 25° C |
| Electron energy | 77eV |
| Detector power supply | -1600/-1000 V |
| PFTBA pressure | $0.9 \cdot 10^{-6}$ Torr |
| PFTBA+He pressure | $1.0 \cdot 10^{-3}$ Torr |
| Background pressure | $1.3 \cdot 10^{-6}$ Torr |
| $CHCL_3$ pressure | $1.8 \cdot 10^{-5}$ Torr |
| $CHCL_3$+He pressure | $1.0 \cdot 10^{-3}$ Torr |
| Background pressure | $4.3 \cdot 10^{-7}$ Torr |

*FIG. 10*

FABRICATION OF THREE-DIMENSIONAL ION OPTICS ASSEMBLIES BY METALLIZATION OF NON-CONDUCTIVE SUBSTRATES

CROSS REFERENCE TO RELATED APPLICATIONS

This application is a continuation of U.S. patent application Ser. No. 11/368,770, filed Mar. 6, 2006, entitled "Fabrication of 3-D Ion Optics Assemblies by Metallization of Non-Conductive Substrates," the contents of which are herein incorporated by reference, which claims the benefit of priority to U.S. Provisional Patent Application 60/594,018, entitled, "Fabrication of 3-D Ion Optics Assemblies by Metallization of Non-Conductive Substrates," filed Mar. 4, 2005, the contents of which are herein incorporated by reference.

STATEMENT OF GOVERNMENT INTEREST

This invention was developed under support from the U.S. Army Space and Missile Defense Command under grant No. DASG600-00-C-0089; accordingly the U.S. government has certain rights in the invention.

FIELD OF INVENTION

This invention relates to three-dimensional ion optics; more specifically, to the fabrication of three-dimensional ion optic assemblies by metallization of non-conductive substrates.

BACKGROUND

In-situ sensors enable researchers to investigate real-time chemical dynamics in the environment, thereby greatly improving sampling densities and providing the capability for autonomous measurements in harsh environments. For example, deployed sensors can be used to detect, quantify and trace harmful and toxic chemicals that have been released in populated areas. Miniaturized mass spectrometers (MS) can be especially versatile and powerful as sensors for on-site identification and characterization of a wide variety of chemicals. Miniaturization is desirable for field-deployed mass spectrometers because of the corresponding reduction of electrical power consumption, simplification of vacuum systems, and the possibility for rapid parallel chemical analysis.

Recent efforts in extreme miniaturization of mass spectrometers and their components have been stimulated by opportunities arising from micro-fabrication techniques and advances in materials sciences. Previous attempts have focused on micro-fabrication of as many as a million micron-sized cylindrical ion trap (CIT) mass spectrometer arrays on silicon wafers. While an array-based approach for MS miniaturization can be useful to compensate for the reduced signal intensities that result from miniaturization of each mass spectrometer, affordable batch fabrication of such arrays remains a challenge.

SUMMARY

The current invention includes, in one embodiment, a method to simplify the fabrication and assembly of cylindrical ion traps (CITs) using new materials and processes. Accordingly, a CIT was made from Low Temperature Co-fired Ceramics (LTCC), used in semi-conductor industry as a packaging material and physical MEMS and RF (MEMS)

devices. LTCC have ceramic particles bound in an organic matrix, which results in the structure behaving as a flexible tape that can be shaped easily, e.g., with a knife. In one embodiment, the LTCC sheets are laminated together under pressure to build up the desired thickness of the unfired structure. Upon firing the organic compounds are volatilized and at 800°-850° C. the glass in the ceramic reflows to impart rigidity to the structure. As the organics are volatilized, the structure shrinks. This shrinkage is a function of the lamination pressure (compaction) and firing cycle.

The current invention is the first to use LTCC to build CIT ring electrodes. Structures were made from LTCC to extract the optimum processing parameters (lamination pressure, method of stacking sheets, firing cycle) to obtain a stable structure devoid of cracks, and to determine the amount of shrinkage. The shrinkage data were used in the design of the ring-electrode punch, to ensure that the finished structure met design specifications. The fired ring was subjected to a three-dimensional lithography process that enabled metallization for completion of the ring electrode. To validate this fabrication method, the LTCC CIT was operated as a mass spectrometer to detect chloroform ($CHCl_3$) and perfluorotributylamine (PFTBA) calibration compound in separate experiments.

In another embodiment, the inventive method for the fabrication of miniature cylindrical ion trap (CIT) mass spectrometers uses a non-conductive substrate. This method allows the feasibility of batch fabrication of accurate and low-cost CITs. A CIT ring electrode ($r_0$=1.375 mm) was fabricated using multiple layers of low temperature co-fired ceramics (LTCC) which were punched and then compressed in a ring-electrode die. Uniform compression was achieved, and cracking avoided, by tailoring the thickness of the LTCC stack. The stack was then fired at 850° C. to convert the LTCC into a ceramic ring.

According to another embodiment, areas to be metallized are patterned photolithographically after the substrate is subjected to electroless plating. Stainless steel endplates are affixed to the ring electrode to complete the CIT. The prototype CIT was tested in the mass selective instability mode without axial modulation and produced mass spectra with a typical peak width of 1.8 m/z. Simulations of operation were also performed in ITSIM 5.0 after SIMION 7.0 was used to calculate the contribution of higher order multipoles to the nominally quadrupole potential inside the CIT.

BRIEF DESCRIPTION OF THE DRAWINGS

For a fuller understanding of the invention, reference should be made to the following detailed description, taken in connection with the accompanying drawings, in which:

FIG. 3A is an exploded view of the die assembly showing the portion of the die used to create the impression on the top side of the LTCC ring electrode.

FIG. 7A shows a non-uniform compression of 52 sheets. FIG. 7B shows a uniform compression—28 sheets of LTCC were used in the center region and 12+28+12 sheets in the outer region.

FIG. 10 is a table showing details of the experimental parameters used to obtain mass spectra of PFTBA and $CHCl_3$.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Fabrication Method

Figure 1:
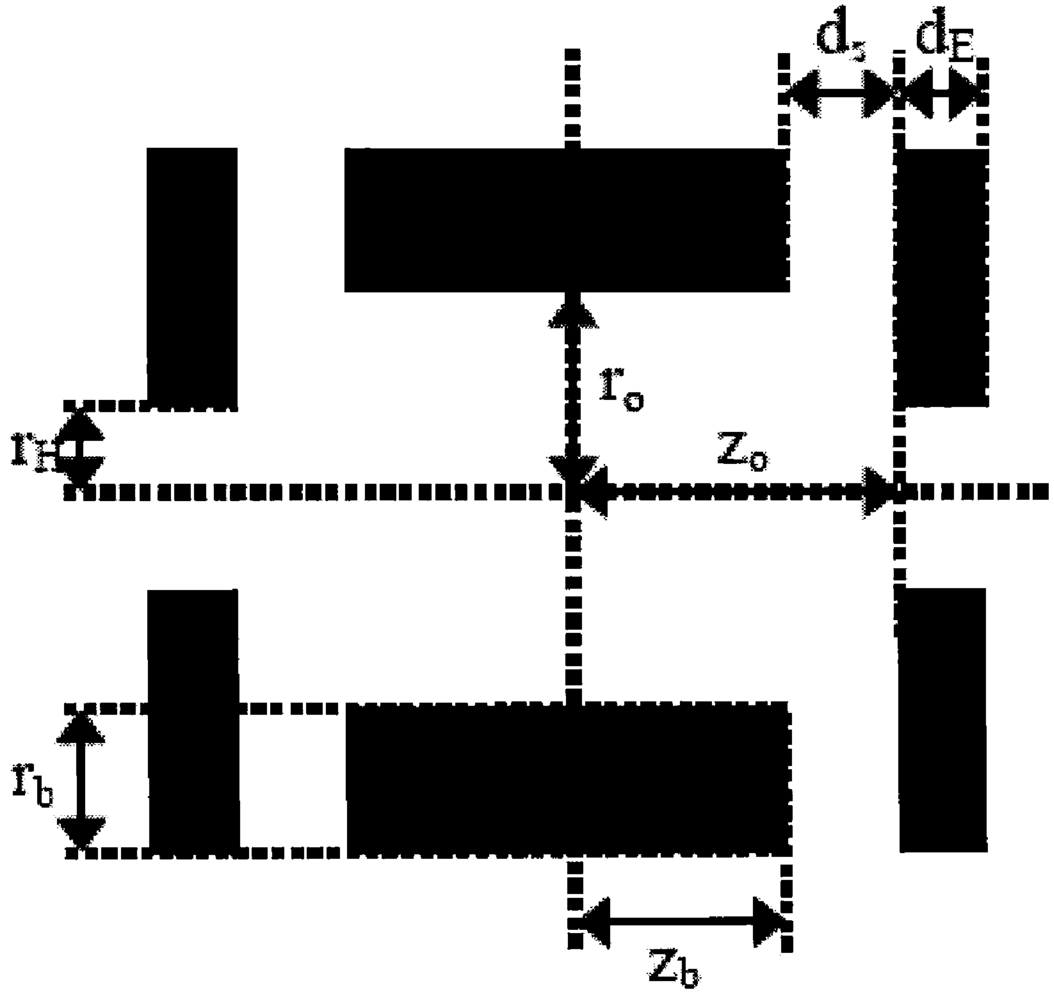
FIG. 1 is a schematic to define the terminology used to describe the dimensions of cylindrical ion traps (CITs).
Figure 2:
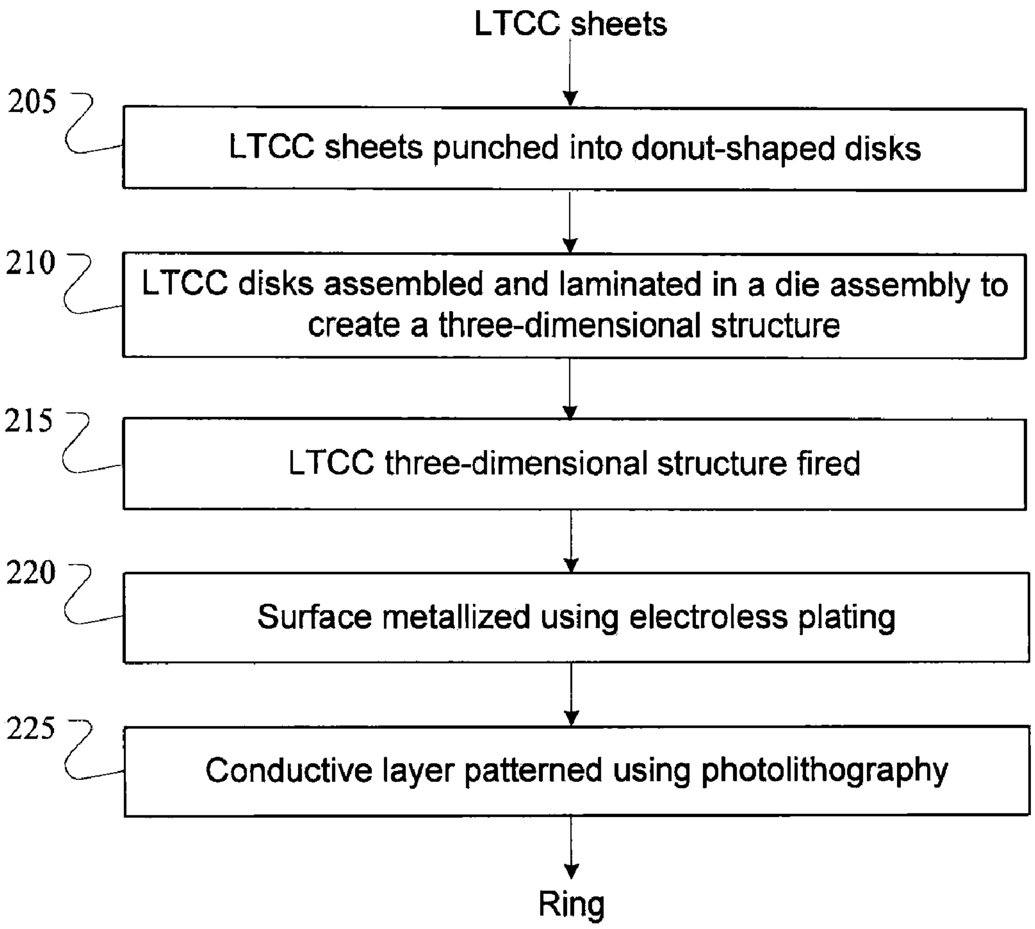
FIG. 2 is a flow diagram for fabrication of the low temperature co-fired ceramics (LTCC) CIT.

Fabrication of the low temperature co-fired ceramic (LTCC) ring electrode is most easily understood by dividing the inventive method into five steps as outlined in FIG. 2. In one embodiment, these steps include punching (operation 205), lamination (operation 210), firing (operation 215), metallization (operation 220), and photolithography on the metallized layer (operation 225). Completion of the cylindrical ion trap (CIT) construction utilizes stainless-steel endplates. While the invention is described below has incorporating five (5) steps, variations including less, or more, than all described steps are contemplated.

Punching and Lamination (Operations 205 and 210)

LTCC sheets, such as 951 GREEN TAPE™ from Dupont, were used for fabrication of the structure. The thickness of each sheet used in the prototype was 0.1 mm. The sheets were cut using a punch designed to accommodate both the CIT design and lateral shrinkage of the tape upon firing into account. Initially, the punch was designed to cut rings with a 19 mm outer diameter and 3 mm inner diameter. The rings were cut in a single step using an assembly of concentrically aligned hammer punches to minimize distortion.

Figure 3A:
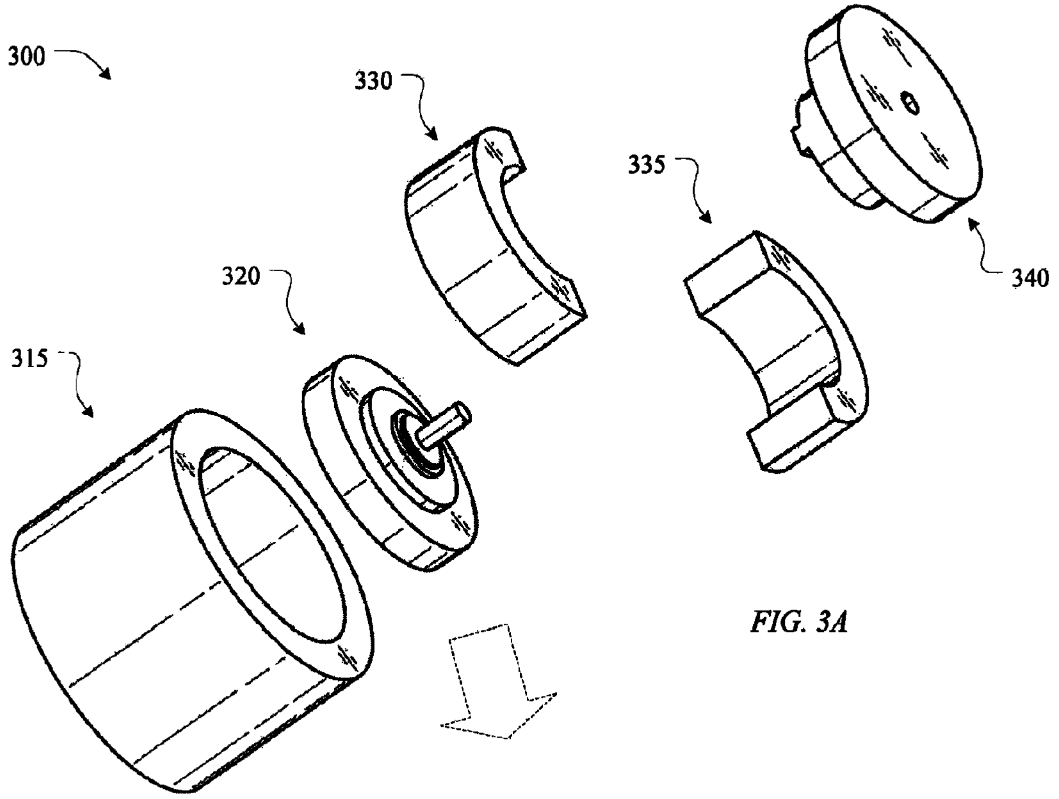
FIGS. 3A though 3D are exploded views of the die assembly used for lamination.
Figure 3B:
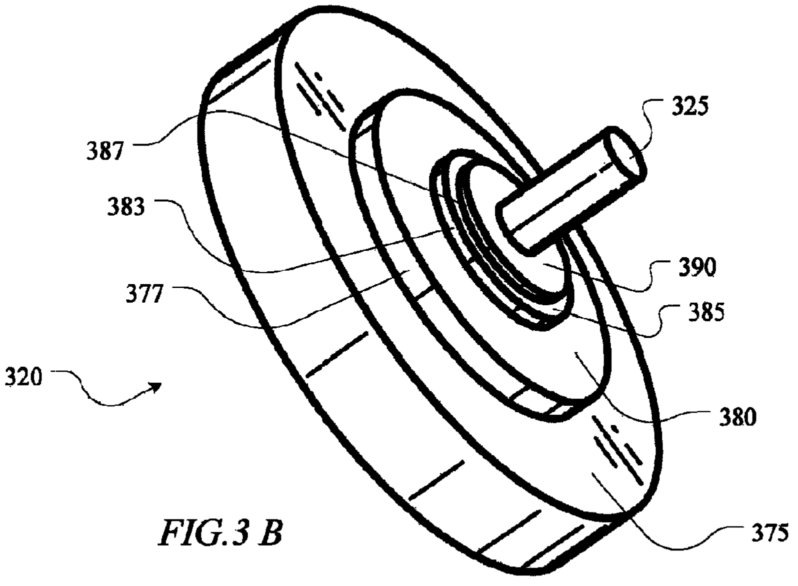
FIG. 3B is a perspective view of die top of the die assembly showing the inverse channel used to create the impression on the top side of the LTCC ring electrode.

The circular sheets were stacked in a stainless steel die assembly, shown in two views in FIGS. 3A and 3B, (with the inverse shape of the ring electrode) designed for lamination of the LTCC sheets. The results (structural integrity) were used to redesign the punch to yield two sets of doughnut shaped discs. Example parameters of the doughnut shaped discs include one with a internal diameter of 3 mm ($d_1$) and the other with an internal diameter of 9.5 mm ($d_2$).

Figure 3C:
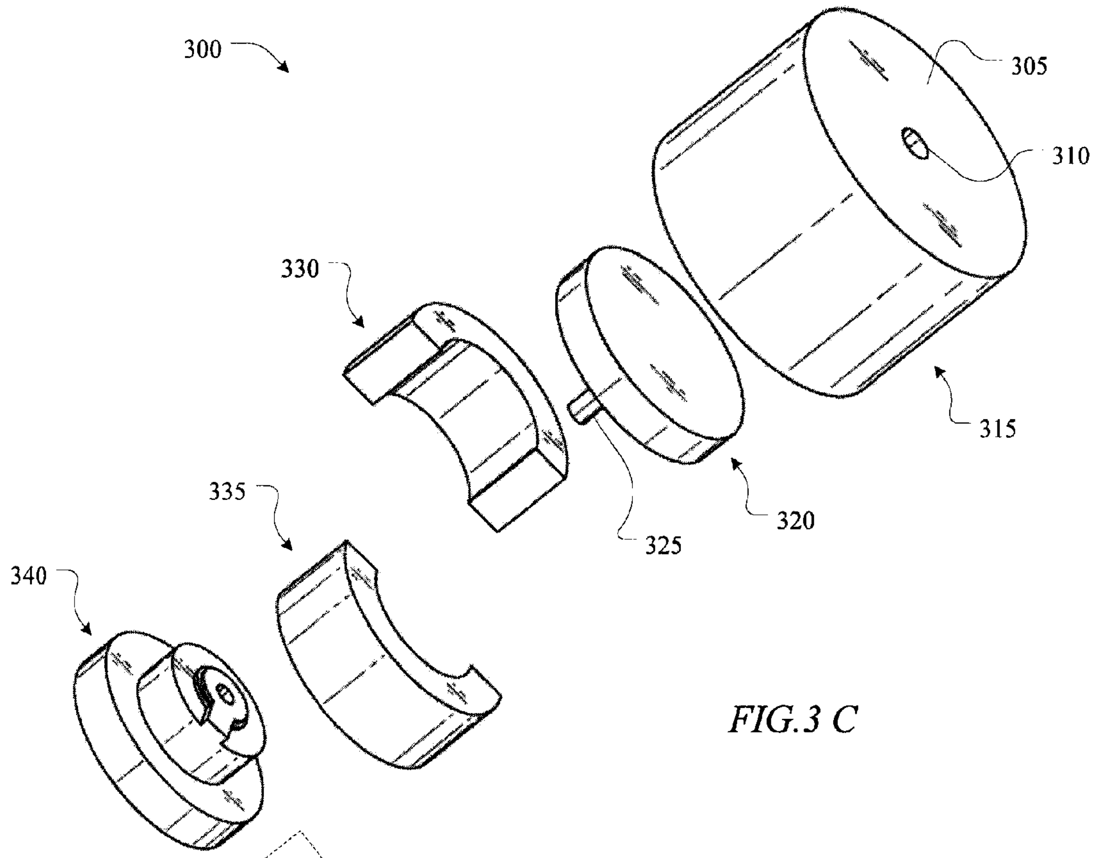
FIG. 3C is an exploded view of the die assembly showing the portion of the die used to create the impression on the bottom side of the LTCC ring electrode.

As shown in FIGS. 3A and 3C, die assembly 300 includes die housing 315, die base 320, die walls 330 and 335, and die top 340. Die housing 315 is cylindrical in shape, hollow at its center, and open on one end as shown in FIGS. 3A and 3C. Die housing 315 may have aperture 310 in bottom portion 305.

Figure 4A:
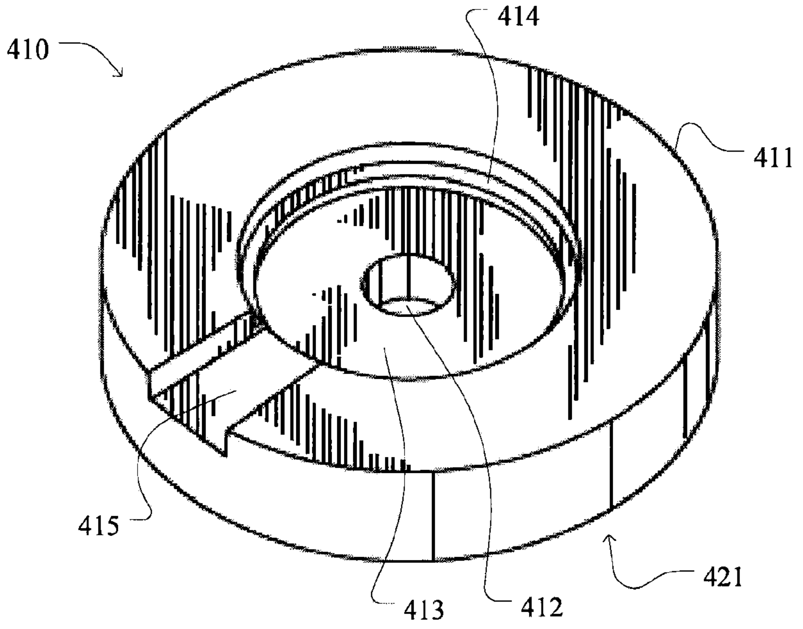
FIG. 4A is a perspective view of the top of the LTCC CIT ring electrode. The channel is for electrical connection to the high voltage rf supply.
Figure 4B:
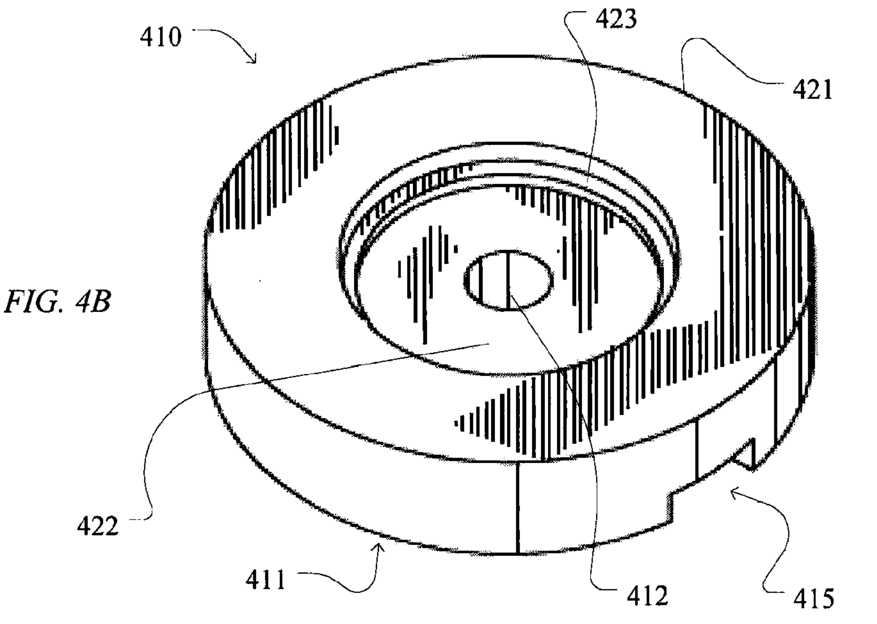
FIG. 4B is a perspective view of the bottom of the LTCC CIT ring electrode.

Die base 320 is also cylindrical in shape and has a diameter just less than the diameter of the inner portion of die housing 315 to allow die base 320 to slide into die housing 315. An enlarged version of die base 320 is shown in FIG. 3B. Die base 320 includes a series of concentric circular elevated surfaces (or steps). First surface 375 has the largest diameter. Second surface 380 has a diameter smaller than the diameter of first surface 375 and is set apart from first surface 375 by an elevation (or step 377). Third surface 385 has a diameter smaller than the diameter of second surface 380 and is set apart from second surface 380 by an elevation (or step 383). Fourth surface 390 has a diameter smaller than the diameter of third surface 385 and is set apart from third surface 385 by an elevation (or step 387). These elevated surfaces (or steps) provide the impressions that are transferred to the bottom side of ring electrode 410, which is shown in FIG. 4B. Die base 320 also includes dowel 325 extending from fourth surface 325, which creates aperture 412 in ring electrode 410 (shown in FIGS. 4A and 4B).

First die wall 335 and second die wall 330 are halves of a hollowed cylinder as shown in FIGS. 3A and 3C. First die wall 335 and second die wall 330 are sized so that they can be positioned on first surface 375 of die base 320 and around step 337. First die wall 335 and second die wall 330 also have an outer diameter just less than the diameter of the inner portion of die housing 315 to allow them to slide into die housing 315 when positioned together on die base 320.

Figure 3D:
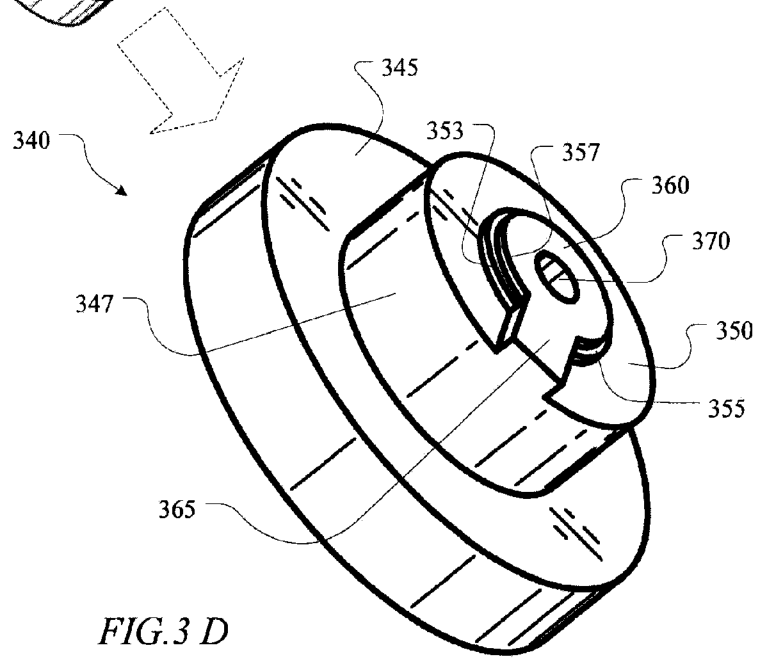
FIG. 3D is a perspective view of die base of the die assembly showing the concentric rings used to create the impression of the top side of the LTCC ring electrode.

Die top 340 is also cylindrical in shape and has a diameter just less than the diameter of the inner portion of die housing 315 to allow die top 340 to slide into die housing 315. An enlarged version of die top 340 is shown in FIG. 3D. Die top 340 includes a series of concentric circular elevated surfaces (or steps) along with inverse channel extension 365. First surface 345 has the largest diameter. Second surface 350 has a diameter smaller than the diameter of first surface 345 and is set apart from first surface 345 by an elevation (or step 347). Third surface 355 has a diameter smaller than the diameter of second surface 350 and is set apart from second surface 350 by an elevation (or step 353). Fourth surface 360 has a diameter smaller than the diameter of third surface 355 and is set apart from third surface 355 by an elevation (or step 357). These elevated surfaces (or steps) provide the impressions that are transferred to the top side of ring electrode 410, which is shown in FIG. 4A. Die top 340 also includes aperture 370 extending through the center of die top 340, which allows for dowel 325 of die base 320 to pass through.

The discs were then assembled in a die such that 28 discs of diameter $d_1$ were sandwiched between 24 discs of diameter $d_2$ (12 on each side). The sheets were pressed in the die under 8000 psi at 85° C. for 15 minutes in a PHI P215H Hydraulic Lamination Press.

For 52 LTCC sheets, compression was 8000 psi which resulted in a semi-hard LTCC ring electrode with the patterns of the die transferred on it. After lamination (operation 210) and before firing (operation 215), three holes were drilled in the LTCC ring electrode to allow for screws to hold the electrical connections in the final device. A channel was also incorporated into the 3D-structure for the purpose of electro-less plating at a later stage to provide a connection for the RF high voltage to the ring electrode.

The top-view of ring electrode 410 is shown in FIG. 4A and the bottom-view of ring electrode 410 is shown in FIG. 4B. Ring electrode 410 comprises first end 411, second end 421, and aperture 412 extending between first end 411 and second end 421. The concentric steps described above are located on both first end 411 and second end 421. In first end 411, these concentric steps are formed from a first depression, which creates first surface 413 and a second depression, which creates second surface 414. Likewise, on second end 421, the concentric steps are formed from a first depression, which creates first surface 422 and second depression, which creates second surface 423. A third depression in first end 411 corresponds to channel 415 and extends from the periphery of ring electrode 410 to first end's first surface 413.

The first step provides for separation of the endplates from ring electrode 410 (to prevent electrical short). The second step was matched to fit and align the stainless steel endplates.

High-Temperature Firing (Operation 215)

The soft LTCC ring electrode was fired in a Barnstead tube furnace at atmospheric pressure. The temperature was ramped to 350° C. at 10° C./minute where it was held constant for 30 minutes. At this temperature, the LTCC lost all of its organic components. The temperature was then increased at the same ramp rate to 850° C., where it was held for 30 minutes. The glass transition temperature of the ceramic coat used in LTCC is 810° C. and at 850° C. the glass reflows and surrounds the grains of ceramic, forming a hard ceramic structure. The resulting hard ceramic 3D-structure was allowed to slowly cool to room temperature.

Metallization and Photolithography (Operation 220 and Operation 225)

Figure 5:
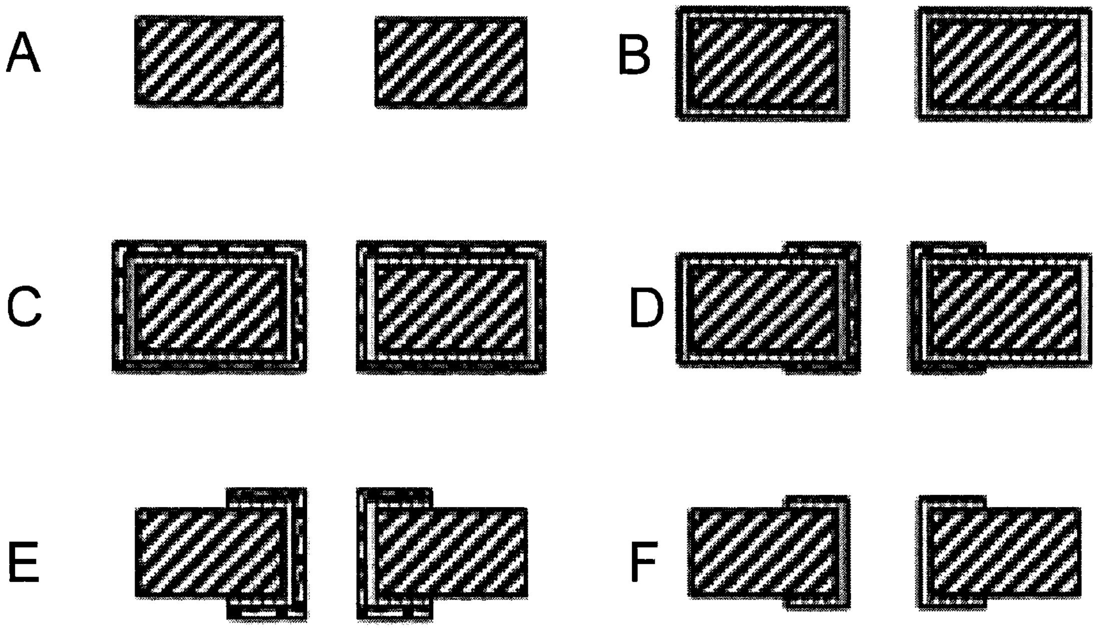
FIG. 5 shows the process flow for patterning of conductive metal layer on the surface of the LTCC ring electrode: (A) Bare LTCC electrode substrate; (B) Substrate plated with electroless Ni and Au; (C) Positive photoresist spun onto both sides; (D) Photoresist patterned using maskless photolithography; (E) metal layer stripped in selected areas; (F) remaining photoresist stripped.

FIG. 5 shows the steps taken to metallize and pattern the LTCC.

Steps A and B: The entire LTCC ring electrode was plated with electroless nickel (Ni) and then with gold (Au) to form a conductive surface. Electroless plating is an autocatalyic process that results in reduction of metal from the solution onto the immersed surface. This technique enables conformal coating of metals on non-conducting three dimensional surfaces. The metallized surface is then used as a plating base for electro or electro-less plating of the desired metals. This two step process ensures minimal stress in the plated films. Nickel has excellent adhesion to the glassy surface of the ring electrode, and served as a seed layer on which gold was electro-less plated. A nickel film, high in phosphorus, was used to eliminate the ferromagnetic behavior of nickel. Electroless gold was plated on top of the nickel to ensure a highly conductive layer, not prone to heating. The electro-less nickel and gold were plated for 6 and 10 minutes, respectively, to get a 2.5 μm thick conductive layer for operation at RF high voltages (up to 1.5 kV and 5.5 MHz in vacuum). The metal layers were then lithographically patterned and etched, as described below, in order to define the conducting and non-conducting regions.

Step C: Double sided mounting tape was used to attach the ring electrode structure onto a glass slide. The glass slide was then held by vacuum on the spinner chuck. Positive photoresist (Shipley 1827) was spun onto the LTCC structure at 2500 RPM for 30 seconds. Since there was a hole at the center of the ring electrode, photoresist was spun on both sides of the LTCC structure in one spinning operation. The substrate was removed from the glass slide, placed on another glass slide and soft baked at 120° C. for 60 seconds. Next the photoresist was exposed by using a SF100, a direct write lithography tool.

Figure 4C:
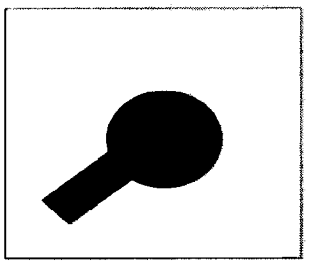
FIG. 4C is a schematic of a mask used for patterning of the conductive layers on the top side of the LTCC CIT ring electrode.

A computer-generated mask was directly imposed via DIGITAL LIGHT PROCESSING™ (DLP) projection of UV light of 488 nm on the three-dimensional structure. The mask for first end 11 is shown in FIG. 4C. The LTCC structure was manually aligned on an X-Y-Z stage with the projection of the mask (using 570 nm light) from the SF100 and was then exposed with UV light of 488 nm for 8 seconds. The mask defined the area where the photoresist was exposed, and therefore those areas where metal was to be removed.

Figure 4D:
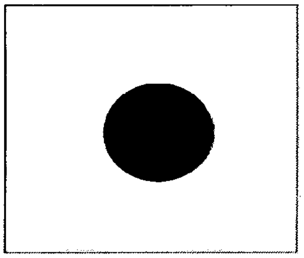
FIG. 4D is a schematic of a mask used for patterning of the conductive layers on the bottom side of the LTCC CIT ring electrode.

Step D: The UV-exposed portion of the photoresist was developed and removed. The resist was developed for 45 seconds. Similar steps were followed on the other side to pattern the photoresist on the backside (or second end 21) with the backside mask, shown in FIG. 4D.

Step E: Once the photoresist was patterned and developed the LTCC structure was dipped 7 minutes in aqua regia (HCL: $HNO_3$: 3:1) solution to remove the exposed metal layers. Aqua regia stripped the metal layers except at those regions that were protected by the patterned photoresist layer.

Step F: The obtained LTCC structure was cleaned in acetone and methanol to dissolve all photoresist residues and was baked at 85° C. to remove any volatile compounds present.

Assembly of CIT

Stainless steel endplate electrodes with an aperture of 0.42 mm radius and a thickness of 0.10 mm were then fitted in the circular grooves on each side of the LTCC ring electrode to complete the CIT. Tab washers constructed from stainless steel sheet held the endplate electrodes in the grooves. The CIT was attached to a stainless steel plate for mounting in the vacuum system. The conductive channel in the LTCC ring electrode was electrically connected to the plate by a copper strip for application of the RF high voltage.

EXAMPLE

Experimental Test Setup

Figure 6:
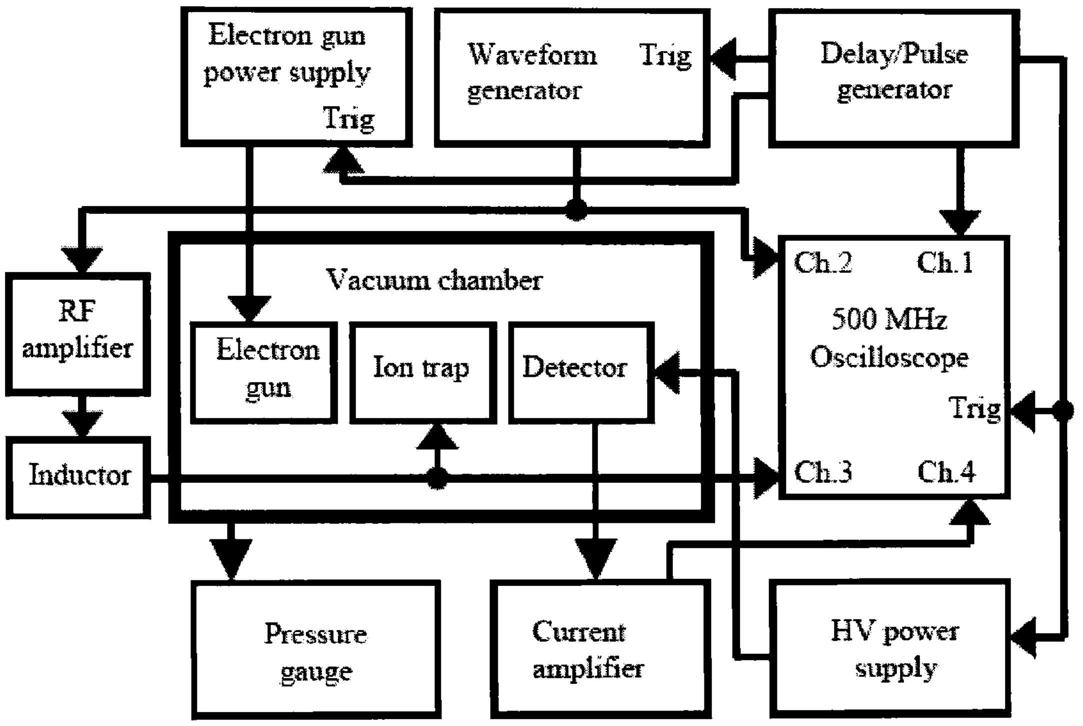
FIG. 6 is a block diagram of the experimental test setup.

The CIT assembly was mounted onto a vacuum flange that was fitted with a series of electrical feedthroughs. An electron multiplier detector was mounted next to one aperture of the CIT. The RF high voltage electrical connection from the flange feedthrough to the ring electrode was shielded from the detector with a stainless steel sheet to avoid pick up of the RF high voltage. The CIT endplate electrodes were grounded to the vacuum flange. The vacuum flange was mounted on a vacuum chamber that had two separate gas inlets, one for analytes and the other for a buffer gas. An electron gun (Kimball Physics Inc ELG-2/EGPS-2) was used for ionization of the analytes. When mounting the CIT the front side of the electron gun was automatically aligned at a distance of 2 cm from the CIT aperture. FIG. 6 shows a detailed diagram of the experimental setup.

To obtain the correct RF voltages and ramp rates a digital delay/pulse generator was used to gate the electron beam for ionization, reduce the detector high voltage during ionization and start and stop the RF ramp for mass analysis. A waveform generator was used to provide a sinusoidal voltage that was ramped in amplitude after an ionization period of 50 ms. This signal was amplified by an ordinary broadband AB push/pull amplifier to generate a high current signal. The output of the broadband amplifier was directly coupled with an inductor that was attached to the CIT. This combination gave a series resonant circuit in which current was transformed to high voltage. To change the resonant frequency the inductance of the circuit was changed. The frequency of the waveform generator was adjusted to obtain a linear ramp. The average power absorbed by the broadband amplifier was about 2 to 3 W. During ionization the RF trapping voltage ($CHCl_3$ @ 3.926 MHz, PFTBA @ 2.970 MHz) was set at 114 Vpp. Then the electron gun was switched off and the RF trapping voltage was ramped from 114 Vpp to 770 Vpp in 20 ms. The detector voltage was switched with a KEPCO high voltage power supply by the Stanford digital delay/pulse generator. The detector was held at −1600 V during the ramping and was held at −1000 V during electron ionization to protect against excessive current from ions created in front of the detector.

The LTCC CIT was tested in the mass selective instability mode using PFTBA (calibration gas) and $CHCl_3$ as analytes, and helium as a buffer gas. The analytes were leaked into the vacuum chamber and were ionized by the electron beam from the electron gun that was operated at 77 eV. The RF voltage amplitude was ramped to eject ions in ascending order of m/z. The ions that impinged on the detector generated a signal current that was amplified with a current amplifier (Advanced Research Instruments Co. PMT5) at a gain of $10^6$ V/A. The signal current was visualized with a LeCroy 9354A oscilloscope to obtain a plot of ion intensity vs. time. The RF voltage amplitude of the ramp was recorded for all the instances and the spectrum was corrected with respect to m/z.

Figure 7A:
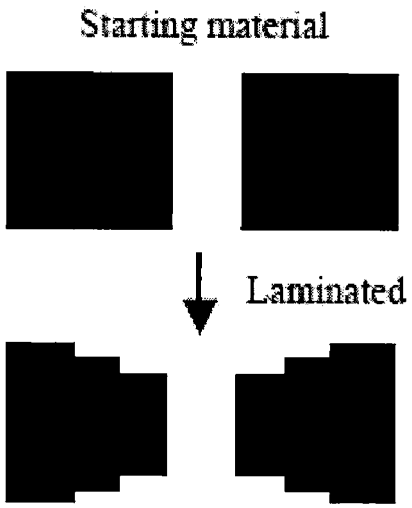
FIGS. 7A and 7B are representations of cross sectional views of LTCC sheets in the stainless steel die during lamination.
Figure 7B:
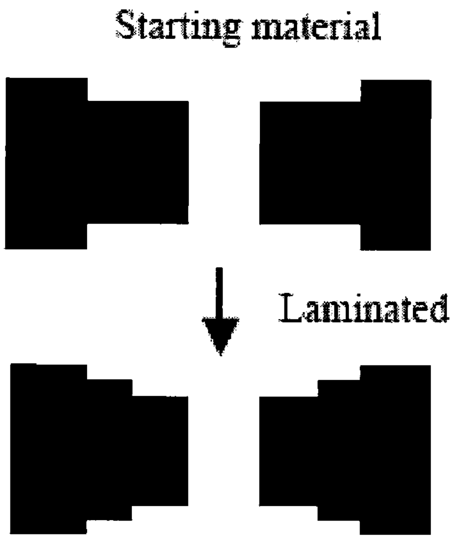

In the fabrication process, the optimum lamination pressure range was found to be higher than that used in the typical LTCC lamination for high-density electronic packing. Initial experiments showed that stresses in the laminated LTCC structure during firing caused cracks in the center of the ring electrode. To reduce stresses and avoid cracks in successive experiments the LTCC sheets were cut in different shapes, then stacked and laminated. The shaping was done to ensure uniform pressure loading in the die relief, as seen in FIG. 7. FIG. 7*a* schematically shows the effect of pressing a stack of laminated sheets into a three-dimensional profile. This approach was used in the first set of experiments. In this approach, the green tapes at the center need to be pressed the most, resulting in non-uniform compacting and cracking. As discussed above, the process was modified by shaping the starting material to be close to its final profile as shown in FIG. 7*b*. This approach results in more uniform compression and eliminates cracking.

Also, the design of the stainless steel die assembly was modified in order to achieve a relatively uniform compression of the material throughout the die volume. The shrinkage during the firing process was found to be smaller because the material was more tightly packed as a result of the higher lamination pressure. Experiments were conducted to optimize the number of sheets used in the lamination process so that shrinkage during the firing process was repeatable and could be compensated for in the design. Once the trap was fabricated, its final dimensions were recorded to calculate the post firing shrinkage. The percentage of post-firing shrinkage was found to be 10%±0.5% in the X-Y direction and 9.5%±0.5% in the Z direction. The overall tolerance of 1% found in this process can be improved by at least one order of magnitude by fabricating the ion traps in standard processing plants and using improved metrology tools. This is routinely achieved in manufacturing as variables (pressure, temperature and humidity) are better controlled. The 1% precision in the current manufacturing process for either $r_0$ or $z_0$ translates into a shift of the mass spectra by less than one mass unit. The concept of using a die assembly to obtain three-dimensional structures could allow for batch fabrication; by incorporating multiple die units in one and lamination of an entire stack of LTCC sheets at one time. This could be an inexpensive alternative to the conventional method of building CIT mass spectrometers of stainless steel. The provision for auto-alignment of different components with the help of grooves and protrusion geometries can make the overall assembly simple.

A tighter tolerance of the metal layer, derived from the precision of the photolithography technique, allows for better control over the electric potential inside the CIT and hence its characteristics. Two different photolithographic methods were tried; one with a positive and, the other with a negative photoresist. The method with negative photoresist (PKP) was found to be less desirable for this application, as the PKP was hard to strip after development.

Figure 8:
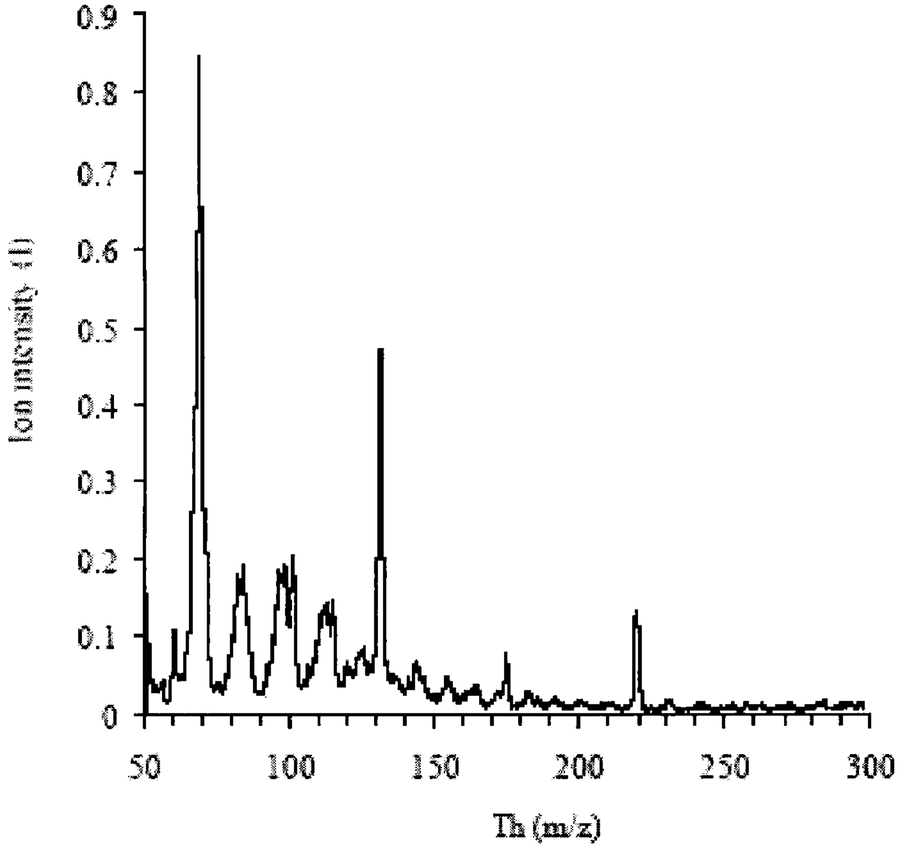
FIG. 8 is a mass spectrum of PFTBA ($0.9 \cdot 10^{-6}$ Torr) obtained from the LTCC CIT. Helium was used as a buffer gas ($1 \cdot 10^{-3}$ Torr) and the rf frequency was 2.970 MHz.

FIG. 10 shows details of the experimental parameters used to obtain mass spectra of PFTBA and $CHCl_3$. Pressures reported were uncorrected. Although the characteristic fragment ions of PFTBA corresponding to m/z 69, 100, 131, 169, and 219 were easily identified, a typical but significant background signal was present due to initial outgassing of the vacuum chamber and the LTCC structure (see FIG. 8). The CIT performed well with PFTBA present at $1 \cdot 10^{-6}$ Torr. Helium buffer gas improved the resolution to 1.8 determined with the Full Width at Half Maximum (FWHM) method.

Figure 9A:
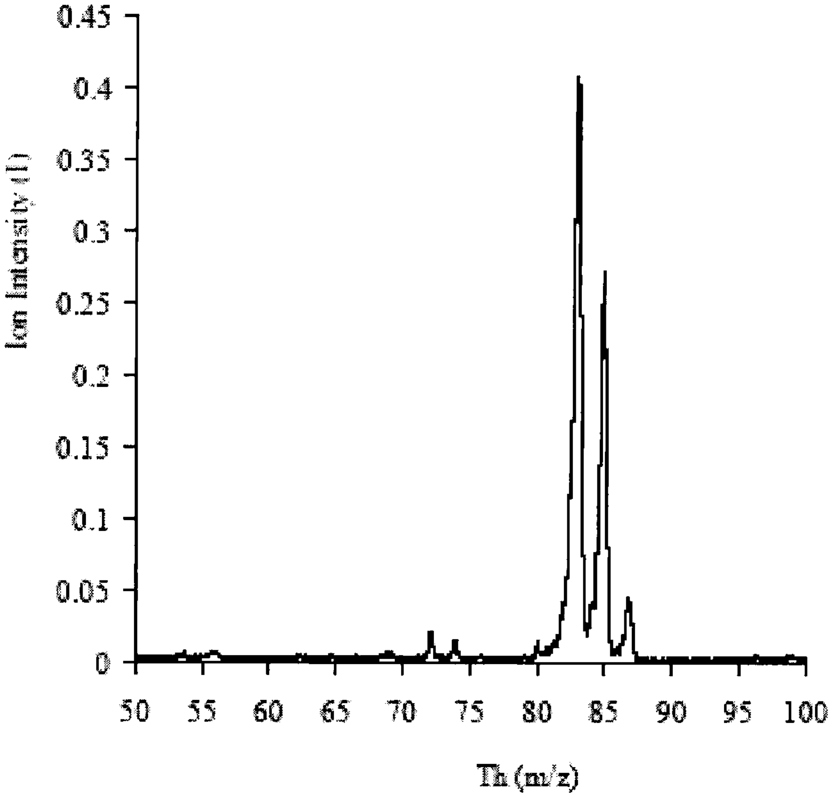
FIG. 9A is a mass spectrum of $CHCl_3$ ($1.8 \cdot 10^{-5}$ Torr) obtained from the LTCC CIT. Helium was used as a buffer gas ($1 \cdot 10^{-3}$ Torr) and the RF frequency was 3.926 MHz.
Figure 9B:
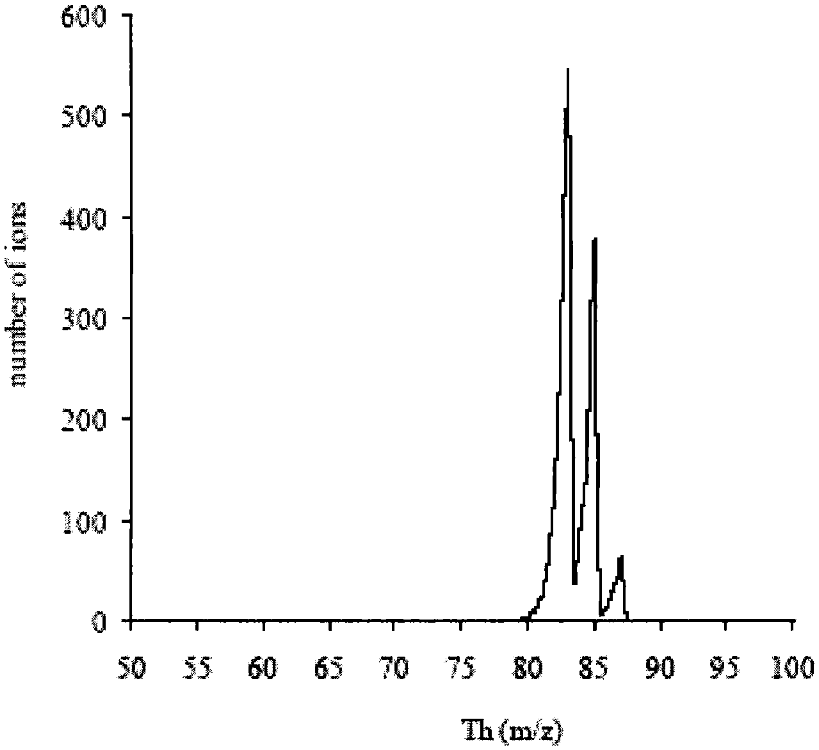
FIG. 9B is a simulated mass spectrum of $CHCl_2^+$ fragment of $CHCl_3$ obtained from ITSIM using geometrical parameters of the LTCC CIT.

The mass spectrum recorded with $CHCl_3$ present in the chamber shows clearly the isotopes of Cl., see FIG. 9*a*. The lowered background signal indicated that the initial outgassing was diminished. The mass spectrum obtained from the simulations in ITSIM is shown in FIG. 9*b* and is remarkably similar to the mass spectrum of $CHCl_3$ obtained during the experiments.

The miniature CIT mass spectrometer was constructed using a non-conductive substrate (LTCC) as the basis for the ring electrode. Photolithography and electroless plating were used to create well-defined conductive areas on the LTCC ring electrode. After adding stainless steel aperture plates, the LTCC CIT was successfully tested using PFTBA and $CHCl_3$ as analytes and helium as the buffer gas. The mass spectra obtained had a typical peak width of 1.8 m/z (FWHM). Higher-order multipole contributions to the potential inside the CIT were determined with SIMION and were used for simulations in ITSIM to confirm operation. Use of soft materials, such as LTCC, could possibly lead to batch fabrication strategies for miniature arrays of cylindrical ion trap mass spectrometers. Precise control over the placement of conductive areas on LTCC might also be useful for new types of electrodes in ion optical systems.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A die assembly comprising:

a cylindrical die housing having a hollow center, an open end, and a bottom;

a cylindrical die base sized to fit through the open end and inside the hollow center of the die housing, the die base having a first circular surface, a second circular surface, spaced apart from the first surface, having a diameter less than the first circular surface, a third circular surface, spaced apart from the second surface, having a diameter less than the second circular surface, a fourth circular surface, spaced apart from the third surface, having a diameter less than the third circular surface, and a dowel, protruding from and orthogonal to the fourth surface, having a diameter less than the fourth circular surface;

a first die wall, having a hollow half-cylinder shape, sized to fit on the first circular surface of the die base, through the open end of the die housing, and inside the hollow center of the die housing;

a second wall, having a hollow half-cylinder shape, sized to fit on the first circular surface of the die base, through the open end of the die housing, and inside the hollow center of the die housing; and a die top sized to fit through the open end and inside the hollow center of the die housing, the die top having a first circular surface, a second circular surface, spaced apart from the first surface, having a diameter less than the first circular surface, a third surface, spaced apart from the second surface, the third surface having a circular shape with an extension protruding therefrom, the circular portion having a diameter less the second surface and the extension having a diameter equal to the diameter of the second surface, a fourth surface, having a circular portion and an extension protruding from the circular portion, the circular portion spaced apart from the third surface and having a diameter less than the circular portion of the third surface and the extension having a diameter equal to the diameter of the second surface, and an aperature extending through the second surface, the third surface, and the fourth surface.

2. The die assembly of claim 1, further comprising:

Said bottom of the die housing having an aperture through its center.

3. A method of fabricating an LTCC ring electrode comprising:

punching one or more LTCC sheet to form a first plurality of rings having a diameter;

punching one or more LTCC sheets to form a second plurality of rings having a diameter smaller than the diameter of the first plurality of rings;

assembling the rings in a die assembly having a base with two concentric circular steps, wherein the second plurality of rings is positioned between rings from the first plurality of rings; and pressing the die assembly in a lamination press to create a soft LTCC ring electrode; and firing the soft LTCC ring electrode to form a hard ring electrode.

4. The method of claim 3, further comprising:

drilling a plurality of holes into the soft LTCC ring electrode.

5. The method of claim 3, further comprising:

plating the hard ring electrode with a conductive material; and photolithographically defining at least one conductive region on the substrate.

* * * * *